UNITED STATES PATENT OFFICE.

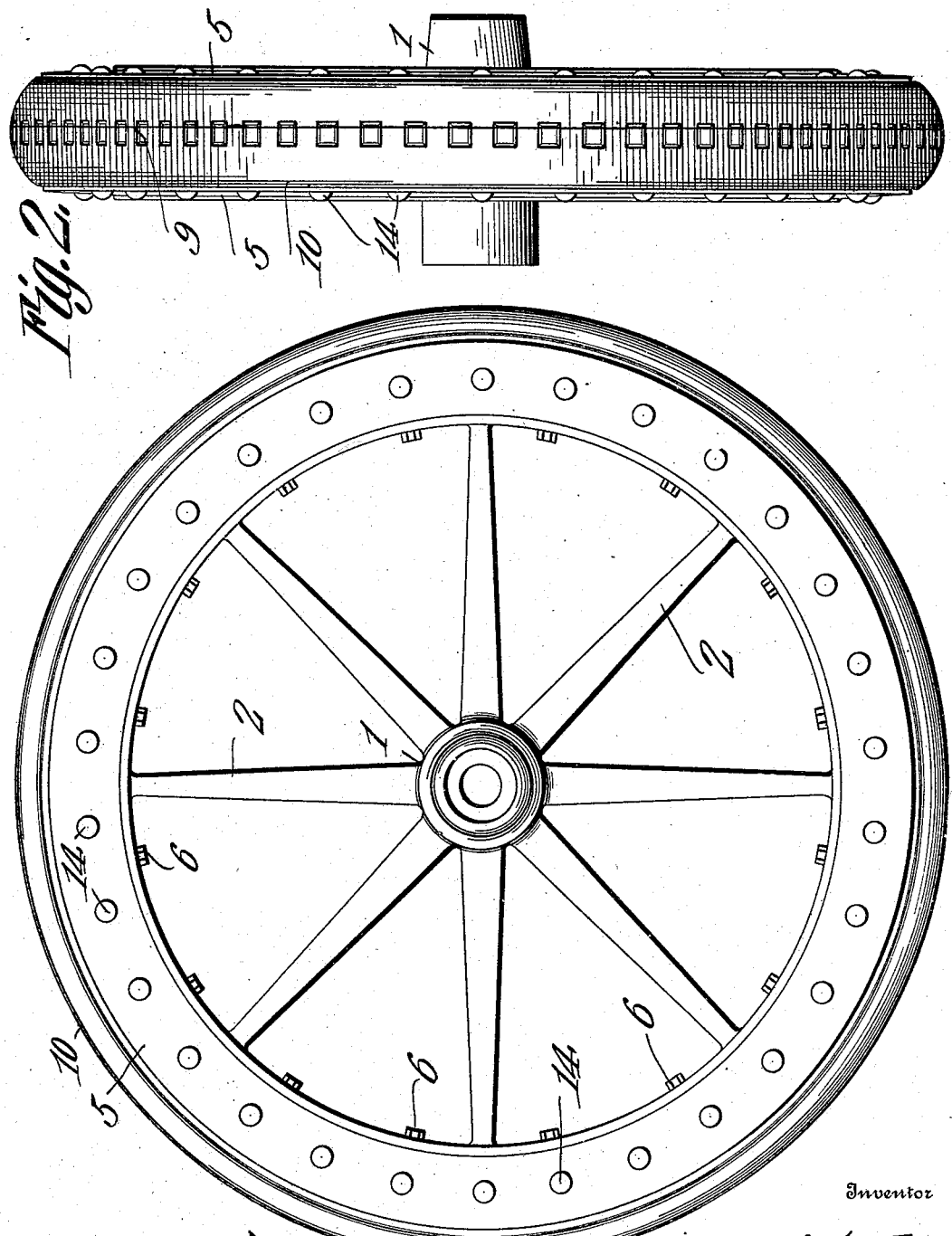

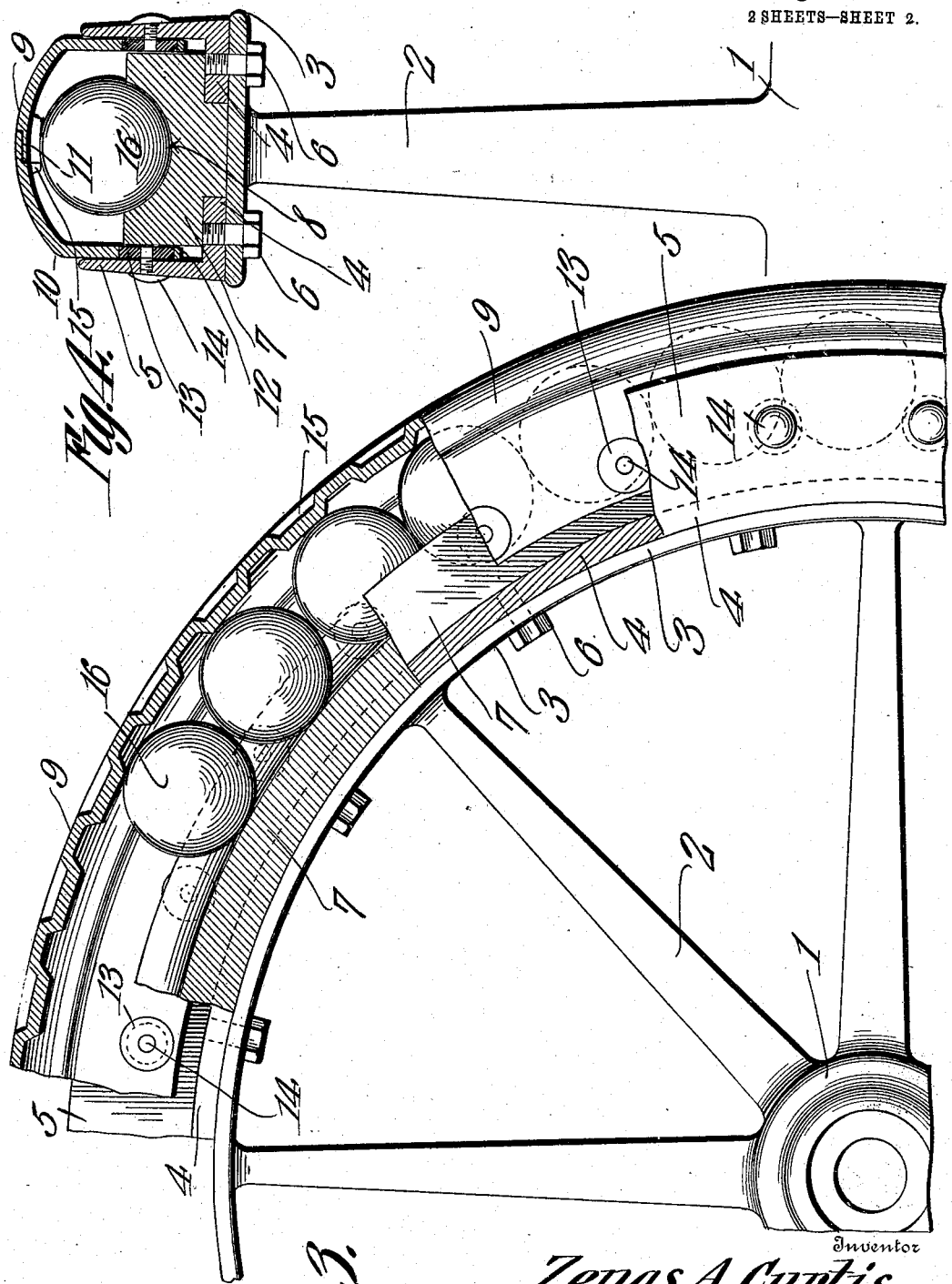

ZENAS ALBERT CURTIS, OF CHANNING, TEXAS.

VEHICLE-WHEEL.

No. 930,355.  Specification of Letters Patent.  Patented Aug. 10, 1909.

Application filed July 17, 1908. Serial No. 444,076.

*To all whom it may concern:*

Be it known that I, ZENAS A. CURTIS, a citizen of the United States, residing at Channing, in the county of Hartley and State of Texas, have invented a new and useful Vehicle-Wheel, of which the following is a specification.

This invention relates to vehicle tires especially designed for use upon the wheels of motor vehicles and the like, and its object is to provide a tire of this character having a cushioned tread portion designed to move relatively to the hub of the wheel to which the tire is applied, so as to constitute an efficient substitute for pneumatic tires and the like, without, however, presenting the disadvantages incident to the use of tires of that form.

Another object is to provide a tire having improved cushioning means for maintaining the tread thereof normally in a predetermined relation to the hub of the wheel to which the tire is applied, said means being simple, durable and efficient, and readily accessible for the purpose of repairing the wheel.

A further object is to provide a wheel of this character which is practically noiseless in operation, and any of the parts of which can be quickly renewed in the event of wear or breakage.

With these and other objects in view, the invention consists of certain novel features of construction and combinations of parts which will be hereinafter more fully described and pointed out in the claims.

In the accompanying drawings is shown the preferred form of the invention.

In said drawings: Figure 1 is a side elevation of a wheel embodying the present improvements. Fig. 2 is an edge view thereof. Fig. 3 is a view partly in section and partly in side elevation of a portion of the wheel. Fig. 4 is a transverse section through a portion of said wheel.

Referring to the figures by characters of reference, 1 designates a wheel hub having spokes 2 radiating therefrom and connected to a rim 3 on the outer or peripheral face of which is secured a tire consisting of rings 4 each of which is L-shaped in cross section, the two rings being oppositely disposed with their outstanding portions constituting annular flanges 5. These rings are detachably secured to the edge portions of the rims 3 by means of bolts 6 or in any other preferred manner. Arranged between the rings 4 and upon the rim 3 is a guide ring 7 having an annular groove or recess 8 in the outer or peripheral portion thereof, said ring being so shaped as to project between the adjoining edges of the rings 4 and to rest upon the base portions thereof, the side faces of the ring 7 being spaced from the flanges 5 as clearly indicated in Fig. 4. Surrounding the ring 7 is a circular housing 9, consisting of oppositely disposed rings 10, the meeting edges of which are reduced in thickness and lap as indicated at 11, so that the two members when brought together form a housing which arches over the periphery of ring 7.

The side portions of the rings 10 are movably mounted between the flanges 5 and the side faces of the ring 7, and formed within these side portions at regular intervals are openings 12, each of which has a disk-like lining 13, of soft rubber or other suitable material. Studs 14, are secured within the flanges 5 at regular intervals, and project into these linings 13, and constitute means for preventing more than a limited rotation of the housing 9 relative to the flanges 5. The tread or marginal portion of housing 9, or, in other words, that portion of the housing formed by the lapping meeting edges of the rings 10 is provided with an annular series of notches 15, designed to prevent slipping or skidding. The annular groove 8 contains a series of cushioning devices preferably in the form of solid rubber balls 16, which bear at opposite points within the grooves 8 and upon the housing 9, said balls preferably contacting as shown in Fig. 3.

All of the parts of the wheel are preferably formed of metal with the exception of the ring 7 and the cushioning members 16. The ring 7 may be made of wood, rubber, fiber, or other light material in lieu of metal. When it is desired to assemble the parts, one of the rings 4 is secured upon the rim 3, and the housing members 10 are then placed in position thereagainst so as to be supported by the studs 14. Balls are placed within the housing and the ring 7 is inserted into the housing 9, after which the other retaining ring 4 is secured upon the rim. When the wheel is in use the housing 9 will be free to move radially relatively to the balance of the wheel and the balls 16 will operate to cushion or gradually control the movement of the housing 9. Obviously, therefore, all jolts to which the wheel is subjected will be absorbed by these cushioning members, and a vehicle provided with these wheels will travel as smoothly as though provided with pneumatic tires of the ordinary form. The studs 14 serve to limit the independent movement of housing 9 and rings 4, and inasmuch as the linings 13 surround the studs, no rattling or other noises will be produced by the operation of the parts of the wheel. To take apart the tire portion of the wheel it is merely necessary to reverse the operation hereinbefore described.

Although the housing 9 is formed of two housing rings or members 10, it is to be understood that these rings or members are to be brazed or otherwise secured together at 11. The ring 7, is formed of sections which can be separately removed from or placed in position.

Obviously, various changes may be made in the structure herein set forth, without departing from the spirit or sacrificing the advantages of the invention.

What is claimed is:

1. The combination with a wheel rim, of oppositely disposed retaining rings upon the edge portions of the rim, a guide ring bearing upon the rim, a tread movably mounted between the retaining and guide rings and extending across the outer face of the guide ring, said tread having apertures in the side portions thereof, cushioning devices within the apertures, projections upon the retaining rings and seated within said cushioning means, and cushioning devices on the guide ring and constituting supports for the tread.

2. The combination with a wheel rim; of oppositely disposed retaining rings secured upon the edge portions of the rim, each of said rings being angular in cross section, an annularly grooved guide ring interposed between the retaining rings and bearing upon the rim, a tread comprising oppositely disposed sections having lapping edge portions, said sections being movably mounted between the retaining and guide rings and having apertures therein, cushioning means within the apertures, studs projecting from the retaining rings and into said cushioning means, and cushioning devices within the groove in the guide ring and constituting supports for the tread.

In testimony that I claim the foregoing as my own, I have hereto affixed my signature in the presence of two witnesses.

ZENAS ALBERT CURTIS.

Witnesses:
FRANK EVANS,
PEARL WESTCOTT.